United States Patent
Radhakrishnan et al.

(10) Patent No.: US 12,517,917 B2
(45) Date of Patent: Jan. 6, 2026

(54) METHOD AND SEARCH SYSTEM WITH METADATA DRIVEN APPLICATION PROGRAMMING INTERFACE (API)

(71) Applicant: Honeywell International Inc., Charlotte, NC (US)

(72) Inventors: Vyas Radhakrishnan, Bangalore (IN); Ankur Bhargava, Bangalore (IN); Rahul Karkara, Bangalore (IN); Klaus Gross, Atlanta, GA (US); Murugan Gopalan, Bangalore (IN); Manu Taranath, Bangalore (IN); Abhinav Srivastava, Bangalore (IN); Chethan R N, Bangalore (IN); Rupesh Mathur, Bangalore (IN); Manish Bhatia, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 123 days.

(21) Appl. No.: 18/152,253

(22) Filed: Jan. 10, 2023

(65) Prior Publication Data
US 2023/0222135 A1 Jul. 13, 2023

(30) Foreign Application Priority Data
Jan. 11, 2022 (IN) .............................. 202211001496

(51) Int. Cl.
*G06F 7/00* (2006.01)
*G06F 9/451* (2018.01)
(Continued)

(52) U.S. Cl.
CPC ............ *G06F 16/248* (2019.01); *G06F 9/451* (2018.02); *G06F 9/547* (2013.01); *G06F 16/27* (2019.01)

(58) Field of Classification Search
CPC ........ G06F 16/27; G06F 16/248; G06F 9/451; G06F 9/547; G06F 16/278; G06F 16/901; G06F 16/90328; G06F 16/9035
See application file for complete search history.

(56) References Cited

U.S. PATENT DOCUMENTS

| | | | |
|---|---|---|---|
| 8,370,224 B2* | 2/2013 | Grewal | G06F 3/0482 705/29 |
| 9,632,837 B2* | 4/2017 | Urdang | G06F 9/5061 |

(Continued)

FOREIGN PATENT DOCUMENTS

| | | |
|---|---|---|
| CN | 107248937 A | 10/2017 |
| CN | 110275898 A | 9/2019 |

(Continued)

OTHER PUBLICATIONS

AU Office Action Mailed on Oct. 18, 2023 for AU Application No. 2023200107, 4 page(s).

(Continued)

*Primary Examiner* — Mohammed R Uddin
(74) *Attorney, Agent, or Firm* — ALSTON & BIRD LLP

(57) ABSTRACT

A computer-implemented method that includes causing display of a search user interface configured for searching visual representations of assets of a relational model comprising information indexed by an application programming interface (API); receiving one or more requests in the search user interface to update the visual representations; comparing, by the API, the one or more requests with the indexed information of the relational model; based on the comparing, determining whether a respective case of one or more cases of one or more assets is in a relationship with the one or more requests; and causing display of the respective case of the one or more cases of the one or more assets in the relationship in the visual representations.

20 Claims, 8 Drawing Sheets

(51) Int. Cl.
    *G06F 9/54*         (2006.01)
    *G06F 16/248*    (2019.01)
    *G06F 16/27*     (2019.01)

(56) References Cited

U.S. PATENT DOCUMENTS

| | | | |
|---|---|---|---|
| 11,288,332 B1* | 3/2022 | Wilson | G06F 16/535 |
| 12,182,149 B1* | 12/2024 | Krishna | G06F 16/248 |
| 2009/0132494 A1 | 5/2009 | Gutlapalli et al. | |
| 2009/0234813 A1* | 9/2009 | Gutlapalli | G06F 16/93 |
| 2009/0327236 A1* | 12/2009 | Denney | G06F 16/70 |
| 2012/0078869 A1 | 3/2012 | Bellville et al. | |
| 2012/0221555 A1* | 8/2012 | Byrne | G06F 16/338 |
| | | | 707/723 |
| 2013/0092545 A1* | 4/2013 | Tang | C25D 15/00 |
| | | | 977/892 |
| 2016/0132595 A1 | 5/2016 | Bliss et al. | |
| 2018/0054490 A1* | 2/2018 | Wadhwa | G08G 1/0129 |
| 2018/0285936 A1* | 10/2018 | Parrotta, Jr. | G06F 3/017 |
| 2019/0004831 A1 | 1/2019 | Sun | |
| 2019/0102478 A1 | 4/2019 | Wei et al. | |
| 2019/0287006 A1 | 9/2019 | Costabello et al. | |
| 2019/0340252 A1* | 11/2019 | Huyghe | G06F 16/532 |
| 2019/0340255 A1 | 11/2019 | Huyghe et al. | |
| 2020/0272621 A1* | 8/2020 | Dessau | G06F 16/90328 |
| 2021/0209140 A1 | 7/2021 | Bhattacharya et al. | |
| 2022/0121965 A1* | 4/2022 | Chatterji | G06F 16/23 |
| 2022/0253495 A1* | 8/2022 | Ganesan | G06F 16/9535 |
| 2022/0382425 A1* | 12/2022 | Southall | G06Q 10/063 |
| 2023/0128293 A1* | 4/2023 | Isaacs | G06F 9/451 |
| 2023/0214096 A1* | 7/2023 | Arora | G06F 3/04817 |
| | | | 715/764 |
| 2024/0362284 A1 | 10/2024 | Mishra et al. | |

FOREIGN PATENT DOCUMENTS

| | | |
|---|---|---|
| CN | 110457504 A | 11/2019 |
| CN | 112020708 A | 12/2020 |
| JP | 2016-207233 A | 12/2016 |
| JP | 2019-531010 A | 10/2019 |
| JP | 2021-525410 A | 9/2021 |

OTHER PUBLICATIONS

Extended European search report Mailed on Jun. 6, 2023 for EP Application No. 23151037, 8 page(s).
AU Notice of Allowance Mailed on Sep. 2, 2024 for AU Application No. 2023200107, 3 page(s).
English Translation of JP Office Action dated Sep. 5, 2024 for JP Application No. 2023001521, 5 page(s).
JP Office Action Mailed on Sep. 5, 2024 for JP Application No. 2023001521, 5 page(s).
English Translation of JP Office Action dated Apr. 4, 2024 for JP Application No. 2023001521, 5 page(s).
JP Office Action Mailed on Apr. 4, 2024 for JP Application No. 2023001521, 6 page(s).
English Translation of JP Office Action dated Feb. 4, 2025 for JP Application No. 2023001521, 5 page(s).
JP Office Action Mailed on Feb. 4, 2025 for JP Application No. 2023001521, 4 page(s).
SA Office Action Mailed on Apr. 21, 2025 for SA Application No. 123441036, 16 page(s).
CN Office Action Mailed on Aug. 18, 2025 for CN Application No. 202310039742, 10 page(s).
English Translation of CN Office Action dated Aug. 18, 2025 for CN Application No. 202310039742, 12 page(s).
SA Notice of Allowance Mailed on Aug. 4, 2025 for SA Application No. 123441036, 2 page(s).

\* cited by examiner

400

401 — STG lastm1classic1a1 – Service Cases

403 — DATE CREATED ⌄ | STG lstm1classic1a1 ⌄ | Year to Date ⌄

405 — Search 🔍

| IDENTIFIED 4428 | IN PROGRESS 209 | DONE 87 |
|---|---|---|
| ○ HUMIDITY SETPOINT FOR WELLNESS OUT OF LIMIT<br>Customer Case: CXXXX \| Forge: HXXXXX<br><br>Zone humidity setpoint is higher than 60% (adj) or lower than 40% (adj). The above conditions to remain true for >30mins (adjs) 2 (adj) times or more in a day or > 60 min…<br>Aac12_r4301<br>7/26/21 \| 5:39 AM | ○ AHHU001 Zone Low Humidity<br>Customer Case: CXXXX \| Forge: HXXXXX<br><br>AHHU001 Zone Low Humidity – Return / Zone humidity is less than setpoint with humidification running<br>GAHu31_r4301<br>10/22/2020 \| 9:27 AM | ○ Humidity Sensor for Wellness Out of Limit<br>Customer Case: CXXXX \| Forge: HXXXXX<br><br>Humidity Sensor for Wellness Out of Limit – Zone relative humidity sensor is higher than 60% (adj) or lower than 40% (adj). The above conditions to remain true for…<br>Controls<br>Aac14_r4301<br>7/21/21 \| 6:25 AM |
| ○ HUMIDITY SETPOINT FOR WELLNESS OUT OF LIMIT<br>Customer Case: CXXXX \| Forge: HXXXXX<br><br>Zone humidity setpoint is higher than 60% (adj) or lower than 40% (adj). The above conditions to remain true for >30mins (adjs) 2 (adj) times or more in a day or > 60 min…<br>Aac14_R4301<br>7/28/21 \| 11:39 AM | ✺ AHHU001 Zone Low Humidity<br>Customer Case: CXXXX \| Forge: HXXXXX<br><br>AHHU001 Zone Low Humidity – Return / Zone humidity is less than setpoint with humidification running<br>LAC07_R4301<br>10/22/2020 \| 9:27 AM | ✺ AHTE003 AHU Cooling Inefficiency<br>Customer Case: CXXXX \| Forge: HXXXXX<br><br>AHTE003 AHU Cooling Inefficiency – Dishcarge air temperature is higher than setpoint when AHU is in cooling mode<br>Aac12_r4301<br>7/9/21 \| 2:56 AM |
| ○ HUMIDITY SETPOINT FOR WELLNESS OUT OF LIMIT<br>Customer Case: CXXXX \| Forge: HXXXXX<br><br>Zone humidity setpoint is higher than 60% (adj) or lower than 40% (adj). The above conditions to remain true for >30mins (adjs) 2 (adj) times or more in a day or > 60 min…<br>Aac14_R4301<br>7/28/21 \| 11:39 AM | ○ AHHU001 Zone Low Humidity<br>Customer Case: CXXXX \| Forge: HXXXXX<br><br>AHHU001 Zone Low Humidity – Return / Zone humidity is less than setpoint with humidification running<br>LAC16_R4301<br>10/22/2020 \| 9:27 AM | ○ AHTE001 AHU over Cooling<br>Customer Case: CXXXX \| Forge: HXXXXX<br><br>AHTE001 AHU over Cooling – VATE003 VAV overcooling<br>GAHU31VAV3_13_R4301<br>7/1/21 \| 1:39 AM |

401 STG lastm1classic1a1 – Service Cases

403 | STG lstm1classic1a1 ⌄ | Year to Date ⌄ | 405 Search 🔍

| DATE CREATED ⌄ | | | |
|---|---|---|---|
| IDENTIFIED 4428 | IN PROGRESS 209 | | DONE 87 |
| ○ HUMIDITY SETPOINT FOR WELLNESS OUT OF LIMIT<br>Customer Case: CXXXX \| Forge: HXXXXX<br>Zone humidity setpoint is higher than 60% (adj) or lower than 40% (adj). The above conditions to remain true for >30mins (adjs) 2 (adj) times or more in a day or > 60 min...<br>Aac12_r4301<br>7/26/21 \| 5:39 AM | ○ AHHU001 Zone Low Humidity<br>Customer Case: CXXXX \| Forge: HXXXXX<br>AHHU001 Zone Low Humidity – Return / Zone humidity is less than setpoint with humidification running<br>GAHu31_r4301<br>10/22/2020 \| 9:27 AM | | ○ Humidity Sensor for Wellness Out of Limit<br>Customer Case: CXXXX \| Forge: HXXXXX<br>Humidity Sensor for Wellness Out of Limit – Zone relative humidity sensor is higher than 60% (adj) or lower than 40% (adj). The above conditions to remain true for... Controls<br>Aac14_r4301<br>7/21/21 \| 6:25 AM |
| ○ HUMIDITY SETPOINT FOR WELLNESS OUT OF LIMIT<br>Customer Case: CXXXX \| Forge: HXXXXX<br>Zone humidity setpoint is higher than 60% (adj) or lower than 40% (adj). The above conditions to remain true for >30mins (adjs) 2 (adj) times or more in a day or > 60 min...<br>Aac14_R4301<br>7/28/21 \| 11:39 AM | ⊛ AHHU001 Zone Low Humidity<br>Customer Case: CXXXX \| Forge: HXXXXX<br>AHHU001 Zone Low Humidity – Return / Zone humidity is less than setpoint with humidification running<br>LAC07_R4301<br>10/22/2020 \| 9:27 AM | | ⊛ AHTE003 AHU Cooling Inefficiency<br>Customer Case: CXXXX \| Forge: HXXXXX<br>AHTE003 AHU Cooling Inefficincy – Dishcarge air temperature is higher than setpoint when AHU is in cooling mode<br>Aac12_r4301<br>7/9/21 \| 2:56 AM |
| ○ HUMIDITY SETPOINT FOR WELLNESS OUT OF LIMIT<br>Customer Case: CXXXX \| Forge: HXXXXX<br>Zone humidity setpoint is higher than 60% (adj) or lower than 40% (adj). The above conditions to remain true for >30mins (adjs) 2 (adj) times or more in a day or > 60 min...<br>Aac14_R4301<br>7/28/21 \| 11:39 AM | ○ AHHU001 Zone Low Humidity<br>Customer Case: CXXXX \| Forge: HXXXXX<br>AHHU001 Zone Low Humidity – Return / Zone humidity is less than setpoint with humidification running<br>LAC16_R4301<br>10/22/2020 \| 9:27 AM | | ○ AHTE001 AHU over Cooling<br>Customer Case: CXXXX \| Forge: HXXXXX<br>AHTE001 AHU over Cooling – VATE003 VAV overcooling<br>GAHU31VAV3_13_R4301<br>7/1/21 \| 1:39 AM |

METHOD AND SEARCH SYSTEM WITH METADATA DRIVEN APPLICATION PROGRAMMING INTERFACE (API)

CROSS-REFERENCE TO RELATED APPLICATION(S)

This application claims the benefit of priority to Indian Patent Application No. 202211001496, filed Jan. 11, 2022, the entirety of which is incorporated by reference herein.

TECHNICAL FIELD

Various embodiments of the present disclosure relate generally to an extensible object model. More specifically, methods and systems that include one or more extensible object models in a search system including one or more metadata driven application programming interfaces.

BACKGROUND

In buildings management systems, data can be stored in different stores and spread across various IT systems. As a result of these multiple data sources, there are diverse ways to access the same which can unfortunately lead to disparate and absence of unique approaches to draw insights to these systems and data.

Moreover, in a cloud computing environment, applications and systems are becoming increasingly complex, as many of the functions are delivered by cloud-based services. The solution of this disclosure resolves these and other issues of the art.

SUMMARY

According to certain aspects of the present disclosure, systems and methods that include causing display of a search user interface configured for searching visual representations of assets of a relational model comprising information indexed by an application programming interface (API); receiving one or more requests in the search user interface to update the visual representations; comparing, by the API, the one or more requests with the indexed information of the relational model; based on the comparing, determining whether a respective case of one or more cases of one or more assets is in a relationship with the one or more requests; and causing display of the respective case of the one or more cases of the one or more assets in the relationship in the visual representations.

In some aspects, the receiving the request includes searching cases and/or events of edge devices in communication therewith.

In some aspects, the search user interface is presented on a graphical user interface and the visual representations are presented on the graphical user interface.

In some aspects, the method includes comparing, by the information of the assets indexed by the API, the one or more requests and a number of occurrences of the respective case being in the relationship, the information including metadata of the assets.

In some aspects, the relational model includes the assets with information indexed by the API. The method can include updating the relational model to include the relationship; and updating the API based on metadata the assets.

In some aspects, the one or more requests include at least one of one or more labels, an asset name, one or more labels, one or more descriptions, and one or more services cases.

The method can include generating results of the at least one or more labels, the asset name, the one or more descriptions, and the one or more services cases presented in the visual representations based on determining whether the at least one of the one or more labels, the asset name, the one or more descriptions, and the one or more services cases and the one or more cases is in the relationship with the at least one of the one or more labels, the asset name, and the one or more descriptions.

In some aspects, the one or more requests including data in a first syntax, the method including comparing the first syntax to the one or more syntax of one or more databases of the relational model to determine whether one or more cases is in the relationship.

In some aspects, the method can include in response to user input received in a graphical user interface of the search user interface, switching the graphical user interface between a first mode and a second mode; and displaying one or more cases of in the relationship in the visual representations on the graphical user interface.

In some aspects, the method can include: deriving, by the API indexing information of the relational model, a definition and/or a structure of the assets of the relational model.

In some aspects, the determining whether the respective case of the one or more cases is in the relationship with the one or more requests includes identifying a type of data coming from the indexed information of the relational model.

In some aspects, the causing display of the respective case of the one or more cases of the one or more assets in the relationship in the visual representations can include displaying the visual representations on a selective grid array of a graphical user interface including a plurality of columns containing one or more associated status.

In some aspects, a system is disclosed that includes a processor and a memory. The processor can be configured to cause display of a search user interface configured for searching visual representations of assets of a relational model including information indexed by an application programming interface (API); receive one or more requests in the search user interface to update the visual representations; compare, by the API, the one or more requests with the indexed information of the relational model; based on the comparing, determine whether a respective case of one or more cases of one or more assets is in a relationship with the one or more requests; and cause display of the respective case of the one or more cases of the one or more assets in the relationship in the visual representations.

In some aspects, the processor further compares, by the information of the assets indexed by the API, the one or more requests and a number of occurrences of the respective case being in the relationship, the information including metadata of the assets.

In some aspects, the one or more requests can include at least one of one or more labels, an asset name, one or more labels, one or more descriptions, and one or more services cases. The processor further generates results of the at least one or more labels, the asset name, the one or more descriptions, and the one or more services cases presented in the visual representations based on determining whether the at least one of the one or more labels, the asset name, the one or more descriptions, and the one or more services cases and the one or more cases is in the relationship with the at least one of the one or more labels, the asset name, and the one or more descriptions.

In some aspects, the one or more requests can include data in a first syntax. The processor can compare the first syntax to the one or more syntax of one or more databases of the relational model to determine whether one or more cases is in the relationship.

In some aspects, the processor can, in response to user input received in a graphical user interface of the search user interface, switch the graphical user interface between a first mode and a second mode; and display one or more cases of in the relationship in the visual representations on the graphical user interface.

In some aspects, the processor can define an analytic algorithm relating to operation of the API; and in response to a predetermined condition being met based on the analytic algorithm and the one or more requests, present an event of interest related to the predetermined condition in the visual representations.

In some aspects, a non-transitory computer-readable storage medium is disclosed for storing instructions that, when executed by a processor, cause the processor to perform a method including causing display of a search user interface configured for searching visual representations of assets of a relational model including information indexed by an application programming interface (API); receiving one or more requests in the search user interface to update the visual representations; comparing, by the API, the one or more requests with the indexed information of the relational model; based on the comparing, determining whether a respective case of one or more cases of one or more assets is in a relationship with the one or more requests; and causing display of the respective case of the one or more cases of the one or more assets in the relationship in the visual representations.

In some aspects, the processor of the non-transitory computer-readable storage medium defines an analytic algorithm relating to operation of the API; and in response to a predetermined condition being met based on the analytic algorithm and the one or more requests, presents an event of interest related to the predetermined condition in the visual representations.

In some aspects, the one or more requests include at least one of one or more labels, an asset name, one or more labels, one or more descriptions, and one or more services cases. In some aspects, the processor of the non-transitory computer-readable storage medium generates results of the one or more labels, the asset name, the one or more descriptions, and the one or more services cases presented in the visual representations based on determining whether the at least one label, the asset name, the one or more labels, the one or more descriptions, and the one or more services cases and the one or more cases is in the relationship with the at least one of the one or more labels, the asset name, and the one or more descriptions It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 4 depicts an exemplary diagram of a system of the type depicted in FIG. 3 and related user interface in a first mode, according to an exemplary embodiment.

FIG. 5 depicts an exemplary diagram of a system of the type depicted in FIGS. 3-4 in another mode, according to an exemplary embodiment.

FIG. 6 depicts an exemplary diagram of a system of the type depicted in FIGS. 4-5 in another mode, according to an exemplary embodiment.

DETAILED DESCRIPTION OF EMBODIMENTS

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

In general, the present disclosure provides for an "Internet-of-Things" or "IoT" platform for enterprise performance management that uses real-time accurate models and visual analytics to deliver intelligent actionable recommendations for sustained peak performance of an enterprise or organization. The IoT platform is an extensible platform that is portable for deployment in any cloud or data center environment for providing an enterprise-wide, top to bottom view, displaying the status of processes, assets, people, and safety. Further, the IoT platform of the present disclosure supports end-to-end capability to execute digital twins against process data and to translate the output into actionable insights, as detailed in the following description.

The IoT platform may include a number of layers including, for example, an extensible object model (EOM) that includes one or more knowledge graphs. The EOM may be a collection of application programming interfaces (APIs) that enables a seeded semantic object model to be extended. The extensible object model further enables a customer's knowledge graph to be built subject to the constraints expressed in the customer's semantic object model. A knowledge graph describes real world entities and their interrelations, organized in a graph. A knowledge graph defines possible classes and relations of entities in a schema, and enables the interrelating of potentially arbitrary entities and (iv) covers various topical domains." Knowledge graphs may include large networks of entities, their semantic types, properties, and relationships between entities. The entities may be physical entities or non-physical entities, such as data.

Figure 1:
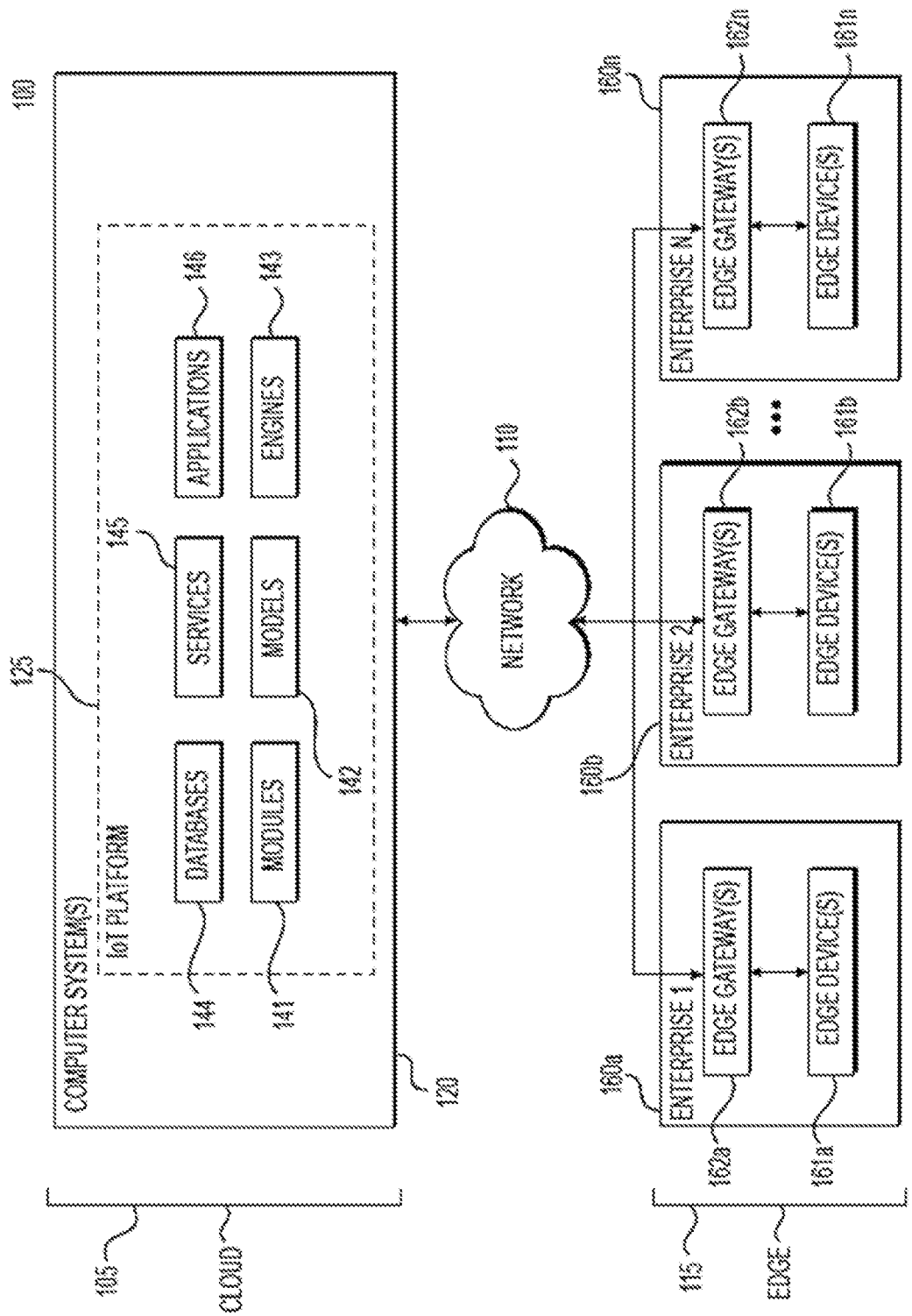
FIG. 1 depicts an exemplary networked computing system environment, according to one or more embodiments.

FIG. 1 illustrates an exemplary networked computing system environment 100, according to the present disclosure. As shown in FIG. 1, networked computing system environment 100 is organized into a plurality of layers including a cloud layer 105, a network layer 110, and an edge layer 115. As detailed further below, components of the edge 115 are in communication with components of the cloud 105 via network 110.

Network 110 may be any suitable network or combination of networks and may support any appropriate protocol suitable for communication of data to and from components of the cloud 105 and between various other components in the networked computing system environment 100 (e.g., components of the edge 115). Network 110 may include a public network (e.g., the Internet), a private network (e.g., a network within an organization), or a combination of public and/or private networks. Network 110 may be configured to provide communication between various components depicted in FIG. 1. Network 110 may comprise one or more networks that connect devices and/or components in the network layout to allow communication between the devices and/or components. For example, the network 110 may be implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, network 110 may be implemented using cellular networks, satellite, licensed radio, or a combination of cellular, satellite, licensed radio, and/or unlicensed radio networks.

Components of the cloud 105 include one or more computer systems 120 that form a so-called "Internet-of-Things" or "IoT" platform 125. It should be appreciated that "IoT platform" is an optional term describing a platform connecting any type of Internet-connected device, and should not be construed as limiting on the types of computing systems useable within IoT platform 125. In particular, computer systems 120 may include any type or quantity of one or more processors and one or more data storage devices comprising memory for storing and executing applications or software modules of networked computing system environment 100. In one embodiment, the processors and data storage devices are embodied in server-class hardware, such as enterprise-level servers. For example, the processors and data storage devices may comprise any type or combination of application servers, communication servers, web servers, super-computing servers, database servers, file servers, mail servers, proxy servers, and/virtual servers. Further, the one or more processors are configured to access the memory and execute processor-readable instructions, which when executed by the processors configures the processors to perform a plurality of functions of the networked computing system environment 100.

Computer systems 120 further include one or more software components of the IoT platform 125. For example, the software components of computer systems 120 may include one or more software modules to communicate with user devices and/or other computing devices through network 110. For example, the software components may include one or more modules 141, models 142, engines 143, databases 144, services 145, and/or applications 146, which may be stored in/by the computer systems 120 (e.g., stored on the memory), as detailed with respect to FIG. 2 below. The one or more processors may be configured to utilize the one or more modules 141, models 142, engines 143, databases 144, services 145, and/or applications 146 when performing various methods described in this disclosure.

Accordingly, computer systems 120 may execute a cloud computing platform (e.g., IoT platform 125) with scalable resources for computation and/or data storage, and may run one or more applications on the cloud computing platform to perform various computer-implemented methods described in this disclosure. In some embodiments, some of the modules 141, models 142, engines 143, databases 144, services 145, and/or applications 146 may be combined to form fewer modules, models, engines, databases, services, and/or applications. In some embodiments, some of the modules 141, models 142, engines 143, databases 144, services 145, and/or applications 146 may be separated into separate, more numerous modules, models, engines, databases, services, and/or applications. In some embodiments, some of the modules 141, models 142, engines 143, databases 144, services 145, and/or applications 146 may be removed while others may be added.

The computer systems 120 are configured to receive data from other components (e.g., components of the edge 115) of networked computing system environment 100 via network 110. Computer systems 120 are further configured to utilize the received data to produce a result. Information indicating the result may be transmitted to users via user computing devices over network 110. In some embodiments, the computer systems 120 may be referred to as a server system that provides one or more services including providing the information indicating the received data and/or the result(s) to the users. Computer systems 120 are part of an entity, which may include any type of company, organization, or institution that implements one or more IoT services. In some examples, the entity may be an IoT platform provider.

Components of the edge 115 include one or more enterprises 160a-160n each including one or more edge devices 161a-161n and one or more edge gateways 162a-162n. For example, a first enterprise 160a includes first edge devices 161a and first edge gateways 162a, a second enterprise 160b includes second edge devices 161b and second edge gateways 162b, and an nth enterprise 160n includes nth edge devices 161n and nth edge gateways 162n. As used herein, enterprises 160a-160n may represent any type of entity, facility, or vehicle, such as, for example, companies, divisions, buildings, manufacturing plants, warehouses, real estate facilities, laboratories, aircraft, spacecraft, automobiles, ships, boats, military vehicles, oil and gas facilities, or any other type of entity, facility, and/or vehicle that includes any number of local devices.

The edge devices 161a-161n may represent any of a variety of different types of devices that may be found within the enterprises 160a-160n. Edge devices 161a-161n are any type of device configured to access network 110, or be accessed by other devices through network 110, such as via an edge gateway 162a-162n. Edge devices 161a-161n may be referred to in some cases as "IoT devices," which may therefore include any type of network-connected (e.g., Internet-connected) device. For example, the edge devices 161a-161n may include sensors, actuators, processors, computers, valves, pumps, ducts, vehicle components, cameras, displays, doors, windows, security components, HVAC components, factory equipment, and/or any other devices that may be connected to the network 110 for collecting, sending, and/or receiving information. Each edge device 161a-161n includes, or is otherwise in communication with, one or more controllers for selectively controlling a respective edge device 161a-161n and/or for sending/receiving information between the edge devices 161a-161n and the cloud 105 via network 110.

Figure 2:
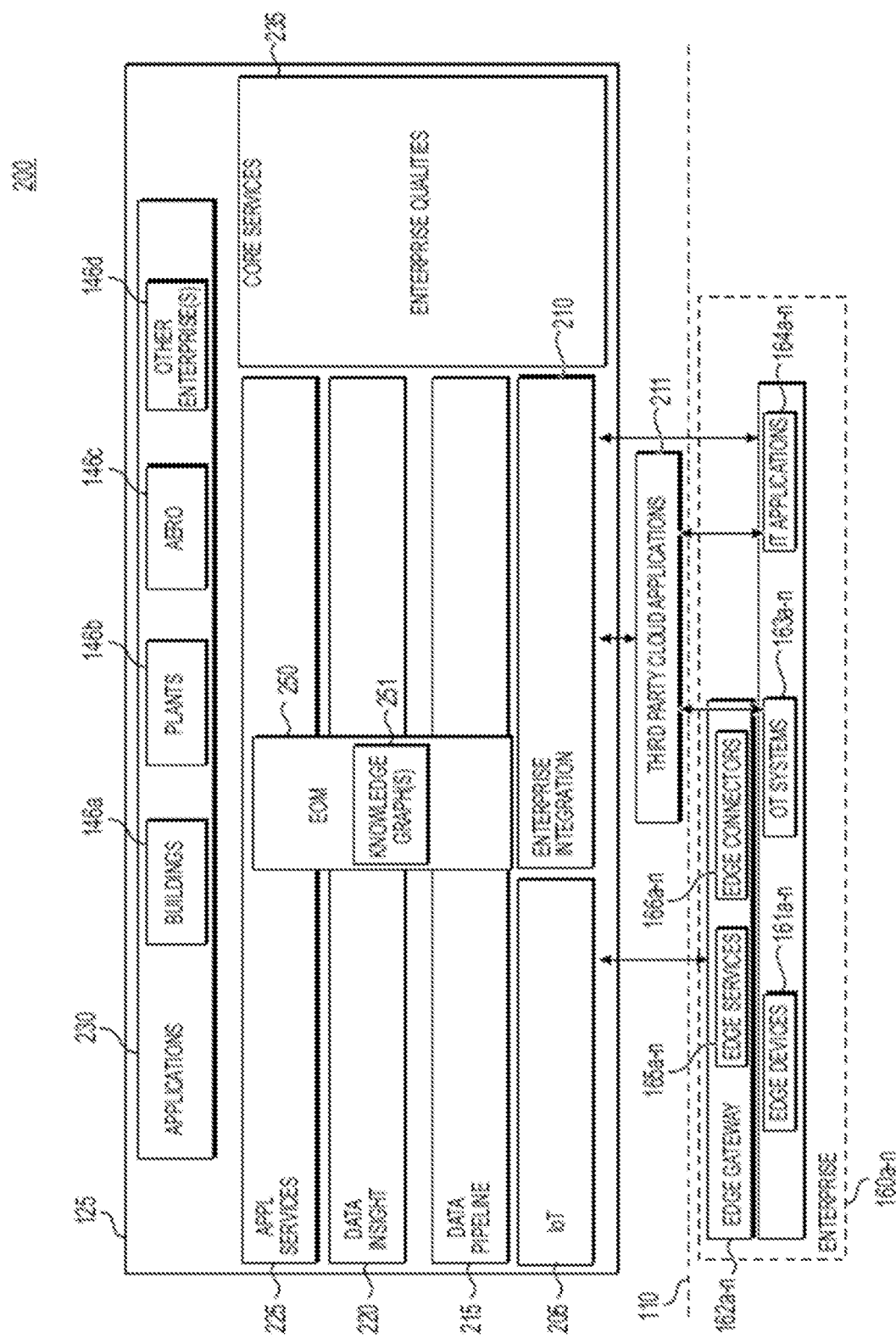
FIG. 2 depicts a schematic block diagram of a framework of an Internet-of-Things (IoT) platform of the networked computing system environment of FIG. 1, the IoT platform comprising one or more extensible object models ("EOM").

With reference to FIG. 2, the edge 115 may also include operational technology (OT) systems 163a-163n and information technology (IT) applications 164a-164n of each enterprise 161a-161n. The OT systems 163a-163n include hardware and software for detecting and/or causing a change, through the direct monitoring and/or control of industrial equipment (e.g., edge devices 161a-161n), assets, processes, and/or events. The IT applications 164a-164n includes network, storage, and computing resources for the generation, management, storage, and delivery of data throughout and between organizations.

The edge gateways 162a-162n include devices for facilitating communication between the edge devices 161a-161n and the cloud 105 via network 110. For example, the edge gateways 162a-162n include one or more communication interfaces for communicating with the edge devices 161a-161n and for communicating with the cloud 105 via network 110. The communication interfaces of the edge gateways 162a-162n may include one or more cellular radios, Bluetooth, WiFi, near-field communication radios, Ethernet, or other appropriate communication devices for transmitting and receiving information. Multiple communication interfaces may be included in each gateway 162a-162n for providing multiple forms of communication between the edge devices 161a-161n, the gateways 162a-162n, and the cloud 105 via network 110. For example, communication may be achieved with the edge devices 161a-161n and/or the network 110 through wireless communication (e.g., WiFi, radio communication, etc.) and/or a wired data connection (e.g., a universal serial bus, an onboard diagnostic system, etc.) or other communication modes, such as a local area network (LAN), wide area network (WAN) such as the Internet, a telecommunications network, a data network, or any other type of network.

The edge gateways 162a-162n may also include a processor and memory for storing and executing program instructions to facilitate data processing. For example, the edge gateways 162a-162n can be configured to receive data from the edge devices 161a-161n and process the data prior to sending the data to the cloud 105. Accordingly, the edge gateways 162a-162n may include one or more software modules or components for providing data processing services and/or other services or methods of the present disclosure.

With reference to FIG. 2, each edge gateway 162a-162n includes edge services 165a-165n and edge connectors 166a-166n. The edge services 165a-165n may include hardware and software components for processing the data from the edge devices 161a-161n. The edge connectors 166a-166n may include hardware and software components for facilitating communication between the edge gateway 162a-162n and the cloud 105 via network 110, as detailed above. In some cases, any of edge devices 161a-n, edge connectors 166a-n, and edge gateways 162a-n may have their functionality combined, omitted, or separated into any combination of devices. In other words, an edge device and its connector and gateway need not necessarily be discrete devices.

More specifically, FIG. 2 illustrates a schematic block diagram of framework 200 of the IoT platform 125, according to the present disclosure. The IoT platform 125 of the present disclosure is a platform for enterprise performance management that uses real-time accurate models and visual analytics to deliver intelligent actionable recommendations for sustained peak performance of the enterprise 160a-160n.

The IoT platform 125 is an extensible platform that is portable for deployment in any cloud or data center environment for providing an enterprise-wide, top to bottom view, displaying the status of processes, assets, people, and safety. Further, the IoT platform 125 supports end-to-end capability to execute digital twins against process data and to translate the output into actionable insights, using the framework 200, detailed further below.

The framework 200 of the IoT platform 125 comprises a number of layers including, for example, an IoT layer 205, an enterprise integration layer 210, a data pipeline layer 215, a data insight layer 220, an application services layer 225, and an applications layer 230. The IoT platform 125 also includes a core services layer 235 and an extensible object model (EOM) 250 comprising one or more knowledge graphs 251. The layers 205-235 further include various software components that together form each layer 205-235. For example, each layer 205-235 may include one or more of the modules 141, models 142, engines 143, databases 144, services 145, applications 146, or combinations thereof. In some embodiments, the layers 205-235 may be combined to form fewer layers. In some embodiments, some of the layers 205-235 may be separated into separate, more numerous layers. In some embodiments, some of the layers 205-235 may be removed while others may be added.

The IoT platform 125 is a model-driven architecture. Thus, the extensible object model 250 communicates with each layer 205-230 to contextualize site data of the enterprise 160a-160n using an extensible object model (or "asset model") and knowledge graphs 251 where the equipment (e.g., edge devices 161a-161n) and processes of the enterprise 160a-160n are modeled. The knowledge graphs 251 of EOM 250 are configured to store the models in a central location. The knowledge graphs 251 define a collection of described real-world connections that enable smart systems. As used herein, a knowledge graph 251: (i) describes real-world entities (e.g., edge devices 161a-161n) and their interrelations organized in a graphical interface; (ii) defines possible classes and relations of entities in a schema; (iii) enables interrelating arbitrary entities with each other; and (iv) covers various topical domains. In other words, the knowledge graphs 251 define large networks of entities (e.g., edge devices 161a-161n), semantic types of the entities, properties of the entities, and relationships between the entities. Thus, the knowledge graphs 251 describe a network of "things" that are relevant to a specific domain or to an enterprise or organization. Knowledge graphs 251 are not limited to abstract concepts and relations, but can also contain instances of objects, such as, for example, documents and datasets. In some embodiments, the knowledge graphs 251 may include resource description framework (RDF) graphs. As used herein, a "RDF graph" is a graph data model that formally describes the semantics, or meaning, of information. The RDF graph can also represent metadata (e.g., data that describes data). Knowledge graphs 251 can also include a semantic object model. The semantic object model is a subset of a knowledge graph 251 that defines semantics for the knowledge graph 251. For example, the semantic object model defines the schema for the knowledge graph 251.

As used herein, EOM 250 is a collection of application programming interfaces (APIs) that enables seeded semantic object models to be extended. For example, the EOM 250 of the present disclosure enables a customer's knowledge graph 251 to be built subject to constraints expressed in the customer's semantic object model. Thus, the knowledge graphs 251 are generated by customers (e.g., enterprises or organizations) to create models of the edge devices 161a-161n of an enterprise 160a-160n, and the knowledge graphs 251 are input into the EOM 250 for visualizing the models.

The models describe the assets (e.g., one or more nodes) of an enterprise (e.g., the edge devices 161a-161n) and describe the relationship of the assets with other components (e.g., the links). The models also describe the schema (e.g., describe what the data is), and therefore the models are self-validating. For example, the model can describe the type of sensors mounted on any given asset (e.g., edge device 161a-161n) and the type of data that is being sensed by each sensor. A key performance indicator (KPI) framework can be used to bind properties of the assets in the extensible object model 250 to inputs of the KPI framework. Accordingly, the IoT platform 125 is an extensible, model-driven end-to-end stack including: two-way model sync and secure data exchange between the edge 115 and the cloud 105, metadata driven data processing (e.g., rules, calculations, and aggregations), and model driven visualizations and applications.

As used herein, "extensible" refers to the ability to extend a data model to include new properties/columns/fields, new classes/tables, and new relations. Thus, the IoT platform 125 is extensible with regards to edge devices 161a-161n and the applications 146 that handle those devices 161a-161n. For example, when new edge devices 161a-161n are added to an enterprise 160a-160n system, the new devices 161a-161n will automatically appear in the IoT platform 125 so that the corresponding applications 146 can understand and use the data from the new devices 161a-161n.

In some cases, asset templates are used to facilitate configuration of instances of edge devices 161a-161n in the model using common structures. An asset template defines the typical properties for the edge devices 161a-161n of a given enterprise 160a-160n for a certain type of device. For example, an asset template of a pump includes modeling the pump having inlet and outlet pressures, speed, flow, etc. The templates may also include hierarchical or derived types of edge devices 161a-161n to accommodate variations of a base type of device 161a-161n. For example, a reciprocating pump is a specialization of a base pump type and would include additional properties in the template. Instances of the edge device 161a-161n in the model are configured to match the actual, physical devices of the enterprise 160a-160n using the templates to define expected attributes of the device 161a-161n. Each attribute is configured either as a static value (e.g., capacity is 1000 BPH) or with a reference to a time series tag that provides the value. The knowledge graph 251 can automatically map the tag to the attribute based on naming conventions, parsing, and matching the tag and attribute descriptions and/or by comparing the behavior of the time series data with expected behavior.

The modeling phase includes an onboarding process for syncing the models between the edge 115 and the cloud 105. For example, the onboarding process can include a simple onboarding process, a complex onboarding process, and/or a standardized rollout process. The simple onboarding process includes the knowledge graph 251 receiving raw model data from the edge 115 and running context discovery algorithms to generate the model. The context discovery algorithms read the context of the edge naming conventions of the edge devices 161a-161n and determine what the naming conventions refer to. For example, the knowledge graph 251 can receive "TMP" during the modeling phase and determine that "TMP" relates to "temperature." The generated models are then published. The complex onboarding process includes the knowledge graph 250 receiving the raw model data, receiving point history data, and receiving site survey data. The knowledge graph 251 can then use these inputs to run the context discovery algorithms. The generated models can be edited and then the models are published. The standardized rollout process includes manually defining standard models in the cloud 105 and pushing the models to the edge 115.

The IoT layer 205 includes one or more components for device management, data ingest, and/or command/control of the edge devices 161a-161n. The components of the IoT layer 205 enable data to be ingested into, or otherwise received at, the IoT platform 125 from a variety of sources. For example, data can be ingested from the edge devices 161a-161n through process historians or laboratory information management systems. The IoT layer 205 is in communication with the edge connectors 165a-165n installed on the edge gateways 162a-162n through network 110, and the edge connectors 165a-165n send the data securely to the IoT platform 205. In some embodiments, only authorized data is sent to the IoT platform 125, and the IoT platform 125 only accepts data from authorized edge gateways 162a-162n and/or edge devices 161a-161n. Data may be sent from the edge gateways 162a-162n to the IoT platform 125 via direct streaming and/or via batch delivery. Further, after any network or system outage, data transfer will resume once communication is re-established and any data missed during the outage will be backfilled from the source system or from a cache of the IoT platform 125. The IoT layer 205 may also include components for accessing time series, alarms and events, and transactional data via a variety of protocols.

The enterprise integration layer 210 includes one or more components for events/messaging, file upload, and/or REST/OData. The components of the enterprise integration layer 210 enable the IoT platform 125 to communicate with third party cloud applications 211, such as any application(s) operated by an enterprise in relation to its edge devices. For example, the enterprise integration layer 210 connects with enterprise databases, such as guest databases, customer databases, financial databases, patient databases, etc. The enterprise integration layer 210 provides a standard application programming interface (API) to third parties for accessing the IoT platform 125. The enterprise integration layer 210 also enables the IoT platform 125 to communicate with the OT systems 163a-163n and IT applications 164a-164n of the enterprise 160a-160n. Thus, the enterprise integration layer 210 enables the IoT platform 125 to receive data from the third party applications 211 rather than, or in combination with, receiving the data from the edge devices 161a-161n directly.

The data pipeline layer 215 includes one or more components for data cleansing/enriching, data transformation, data calculations/aggregations, and/or API for data streams. Accordingly, the data pipeline layer 215 can pre-process and/or perform initial analytics on the received data. The data pipeline layer 215 executes advanced data cleansing routines including, for example, data correction, mass balance reconciliation, data conditioning, component balancing and simulation to ensure the desired information is used as a basis for further processing. The data pipeline layer 215 also provides advanced and fast computation. For example, cleansed data is run through enterprise-specific digital twins. The enterprise-specific digital twins can include a reliability advisor containing process models to determine the current operation and the fault models to trigger any early detection and determine an appropriate resolution. The digital twins can also include an optimization advisor that integrates real-time economic data with real-time process data, selects the right feed for a process, and determines optimal process conditions and product yields.

The data pipeline layer 215 may also use models and templates to define calculations and analytics, and define how the calculations and analytics relate to the assets (e.g., the edge devices 161a-161n). For example, a pump template can define pump efficiency calculations such that every time a pump is configured, the standard efficiency calculation is automatically executed for the pump. The calculation model defines the various types of calculations, the type of engine that should run the calculations, the input and output parameters, the preprocessing requirement and prerequisites, the schedule, etc. The actual calculation or analytic logic may be defined in the template or it may be referenced. Thus, the calculation model can be used to describe and control the execution of a variety of different process models. Calculation templates can be linked with the asset templates such that when an asset (e.g., edge device 161a-161n) instance is created, any associated calculation instances are also created with their input and output parameters linked to the appropriate attributes of the asset (e.g., edge device 161a-161n).

The IoT platform 125 can support a variety of different analytics models including, for example, first principles models, empirical models, engineered models, user-defined models, machine learning models, built-in functions, and/or any other types of analytics models. Fault models and predictive maintenance models will now be described by way of example, but any type of models may be applicable.

Fault models are used to compare current and predicted enterprise 160a-160n performance to identify issues or opportunities, and the potential causes or drivers of the issues or opportunities. The IoT platform 125 includes rich hierarchical symptom-fault models to identify abnormal conditions and their potential consequences. For example, the IoT platform 125 can drill down from a high-level condition to understand the contributing factors, as well as determining the potential impact a lower level condition may have. There may be multiple fault models for a given enterprise 160a-160n looking at different aspects such as process, equipment, control, and/or operations. Each fault model can identify issues and opportunities in their domain, and can also look at the same core problem from a different perspective. An overall fault model can be layered on top to synthesize the different perspectives from each fault model into an overall assessment of the situation and point to the true root cause.

When a fault or opportunity is identified, the IoT platform 125 can make recommendations about the best corrective actions to take. Initially, the recommendations are based on expert knowledge that has been pre-programmed into the system by process and equipment experts. A recommendation services module presents this information in a consistent way regardless of source, and supports workflows to track, close out, and document the recommendation follow-up. The recommendation follow-up can be used to improve the overall knowledge of the system over time as existing recommendations are validated (or not) or new cause and effect relationships are learned by users and/or analytics.

The models can be used to accurately predict what will occur before it occurs and interpret the status of the installed base. Thus, the IoT platform 125 enables operators to quickly initiate maintenance measures when irregularities occur. The digital twin architecture of the IoT platform 125 can use a variety of modeling techniques. The modeling techniques can include, for example, rigorous models, fault detection and diagnostics (FDD), descriptive models, predictive maintenance, prescriptive maintenance, process optimization, and/or any other modeling technique.

The rigorous models can be converted from process design simulation. In this manner, process design is integrated with feed conditions and production requirement. Process changes and technology improvement provide business opportunities that enable more effective maintenance schedule and deployment of resources in the context of production needs. The fault detection and diagnostics include generalized rule sets that are specified based on industry experience and domain knowledge and can be easily incorporated and used working together with equipment models. The descriptive models identify a problem and then the predictive models can determine possible damage levels and maintenance options. The descriptive models can include models for defining the operating windows for the edge devices 161a-161n.

Predictive maintenance includes predictive analytics models developed based on rigorous models and statistic models, such as, for example, principal component analysis (PCA) and partial least square (PLS). Machine learning methods can be applied to train models for fault prediction. Predictive maintenance can leverage FDD-based algorithms to continuously monitor individual control and equipment performance. Predictive modeling is then applied to a selected condition indicator that deteriorates in time. Prescriptive maintenance includes determining what is the best maintenance option and when it should be performed based on actual conditions rather than time-based maintenance schedule. Prescriptive analysis can select the right solution based on the company's capital, operational, and/or other requirements. Process optimization is determining optimal conditions via adjusting set-points and schedules. The optimized set-points and schedules can be communicated directly to the underlying controllers, which enables automated closing of the loop from analytics to control.

The data insight layer 220 includes one or more components for time series databases (TDSB), relational/document databases, data lakes, blob, files, images, and videos, and/or an API for data query. When raw data is received at the IoT platform 125, the raw data can be stored as time series tags or events in warm storage (e.g., in a TSDB) to support interactive queries and to cold storage for archive purposes. Data can further be sent to the data lakes for offline analytics development. The data pipeline layer 215 can access the data stored in the databases of the data insight layer 220 to perform analytics, as detailed above.

The application services layer 225 includes one or more components for rules engines, workflow/notifications, KPI framework, BI, machine learning, and/or an API for application services. The application services layer 225 enables building of applications 146a-d. The applications layer 230 includes one or more applications 146a-d of the IoT platform 125. For example, the applications 146a-d can include a buildings application 146a, a plants application 146b, an aero application 146c, and other enterprise applications 146d. The applications 146 can include general applications 146 for portfolio management, asset management, autonomous control, and/or any other custom applications. Portfolio management can include the KPI framework and a flexible user interface (UI) builder. Asset management can include asset performance and asset health. Autonomous control can include energy optimization and predictive maintenance. As detailed above, the general applications 146 can be extensible such that each application 146 can be configurable for the different types of enterprises 160a-160n (e.g., buildings application 146a, plants application 146b, aero application 146c, and other enterprise applications 146d).

The applications layer 230 also enables visualization of performance of the enterprise 160a-160n. For example, dashboards provide a high-level overview with drill downs to support deeper investigations. Recommendation summaries give users prioritized actions to address current or potential issues and opportunities. Data analysis tools support ad hoc data exploration to assist in troubleshooting and process improvement.

The core services layer 235 includes one or more services of the IoT platform 125. The core services 235 can include data visualization, data analytics tools, security, scaling, and monitoring. The core services 235 can also include services for tenant provisioning, single login/common portal, self-service admin, UI library/UI tiles, identity/access/entitlements, logging/monitoring, usage metering, API gateway/dev portal, and the IoT platform 125 streams.

As described above, EOM 250 and knowledge graphs 251 of FIG. 2 may be central to the definition of relationships between devices and assets of the network. Accordingly, exemplary functions and features of an exemplary EOM consistent with the present disclosure will now be described with reference to FIGS. 3-8.

Figure 3:
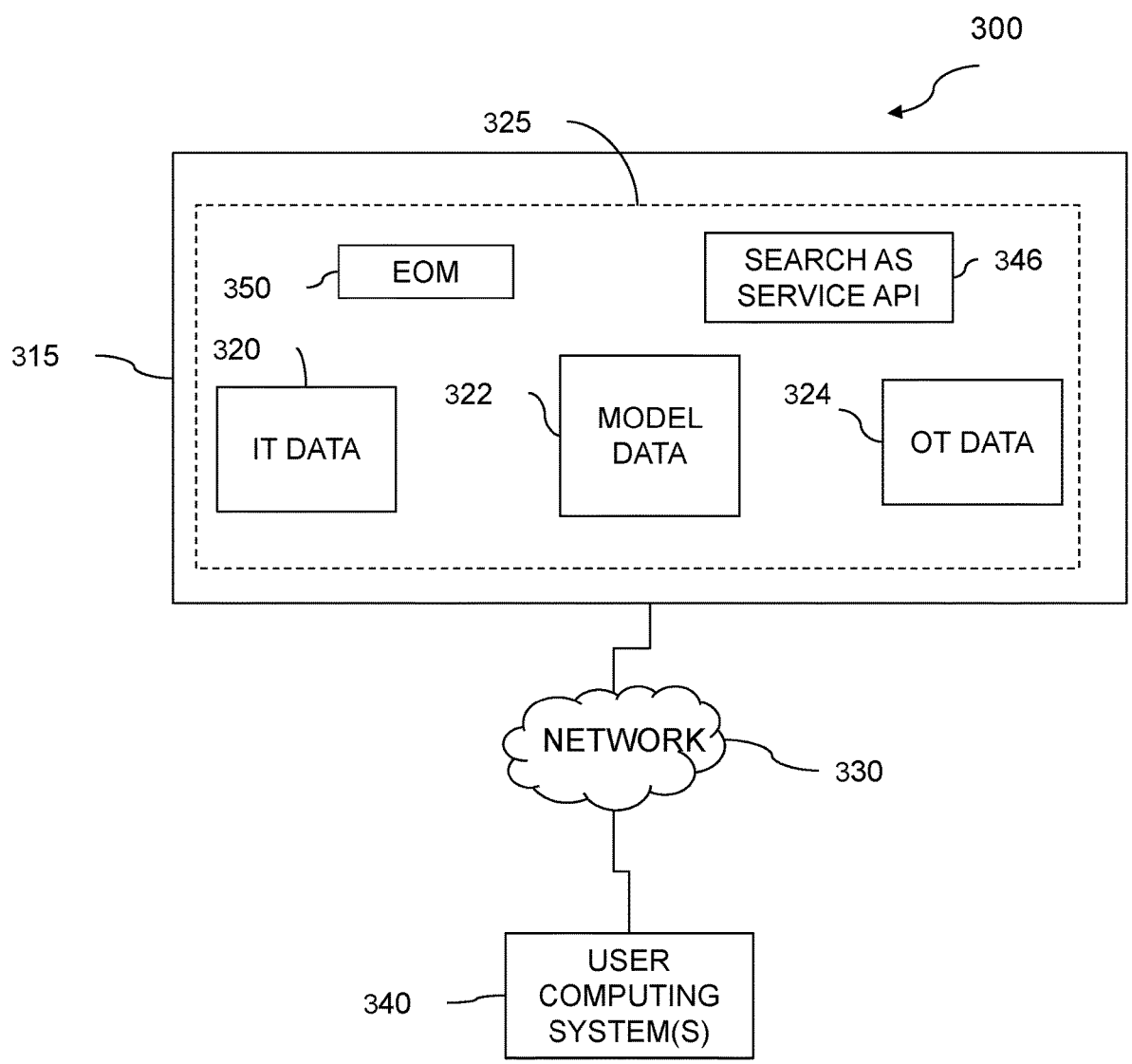
FIG. 3 depicts a schematic block diagram of a framework of a platform contemplated for use with a networked computing system environment (e.g., the system of FIG. 1) that uses Search-as-A-Service (SaaS) via one or more application programming interfaces (APIs).

FIG. 3 illustrates an exemplary networked computing system environment 300, according to the present disclosure. As shown in FIG. 3, networked computing system environment 300 is organized into a plurality of layers including one or more user computer system layers 340, a network layer 330, and cloud layer 315. As detailed further below, components of the cloud 315 can be in communication with components of system 340 via network 330. Similar to previous network 110, network 330 may be any suitable network or combination of networks and may support any appropriate protocol suitable for communication of data to and from components of the cloud 315 and between various other components in the networked computing system environment 300. Components of cloud 315 can include one or more computer systems that form an "IoT" platform 325, similar to platform 115, which can be extensible and include any type or quantity of one or more processors and one or more data storage devices, one or more software components, and one or more software modules to communicate with user devices and/or other computing devices (e.g., system 340) through network 330. For example, the software components may be contrasting and include one or more IT data 320, model data 322, OT data 324, and/or other databases, services, and/or applications, which may be stored in/by computer systems of platform 325 (e.g., stored on the memory). In some aspects, platform 325 can include one or more enterprises (e.g., similar to enterprises 160a-160n each including one or more edge devices and one or more edge gateways).

Graphical user interface (GUI) of system 340 may be used to define and edit assets of an extensible object model (EOM 350) of platform 325 via search-as-a-service (Saas) API layer 346 and EOM 350. In some aspects, API layer 346 can be configured to support enterprise search as well as searching through other resources (e.g., private resources or databases) whereby via API layer 346, corresponding metadata of platform 325 can be indexed to be later searched. In some aspects, EOM 350 can be similar to previously described EOM 250, and can communicate with layers to contextualize site data of enterprises of EOM 350 using an extensible object model (or "asset model"). Metadata can be synced in a cache of EOM 350 which can be searchable by API layer 346. For example, the type name may be entered, defined, and/or otherwise edited by a user in the GUI. API 346 of platform 325 in turn enables seeded semantic object models via one or more graphical user interfaces. For example, when an edge devices it will appear in platform 325 so API 346 can understand, identify, and use the data (e.g., query the data) from the new edge devices.

In some aspects, API layer 346 can be rest end point built to support searching cases and/or events of edge devices in communication therewith. Because API layer 346 can be metadata driven (e.g., for a given resources the request, response structure may not be hardcoded), advantageously different end-users can have varying definition and/or structure for respective resources, whereby such definition and/or structure can be derived from EOM 350. In some aspects, the source of data for each object of platform 325 can vary (e.g., service cases can be stored in elastic search while assets can be stored in EOM 350, and asset telemetry can be stored in an influx store).

FIG. 4 depicts an exemplary diagram 400 of one example mode of presenting, defining, and editing assets and relationships of previous computing system 300, according to an exemplary embodiment. For example, in a service mode 401, a graphical user interface (GUI) area 403 may be used to define and edit assets of an example relational model so as to define and/or update previous EOM 350, which can include dynamically defined assets and relationships between the assets. The exemplary relational model of diagram 400 can relate to one or more humidity sensors associated with corresponding one or more zones of an AHU as well as other assets (e.g., one or more other zones of a building). The AHU may of course have other sensors detecting information other than humidity and/or be located in the same or other zones of the AHU.

A search query in a search bar icon 405 may be entered by a user and label attributes, such as date created, a model version, a service case condition, and/or a year-to-date, may be selected from one or more drop down menus of GUI area 403 and/or entered in a customized manner by the end-user. In GUI area 404, in response to a predetermined condition being met based on an analytic algorithm determined by the search query and one or more assets edited in GUI area 403, one or more corresponding events can be presented therein. The analytic algorithm can be based on metadata associated with the assets of EOM 350 (e.g., name of asset, one or more labels, one or more descriptors, one or more services cases, etc.). In some aspects, the metadata can relate to operations of one or more edge devices. For example, the metadata may provide information about a humidity sensor of a particular zone. The information can include log data that identifies that an event satisfying one or more conditions (e.g., a humidity, a cooling efficiency, a discharge air temperature, a zone humidity, and/or a cooling rate is less than, greater than, and/or equal to a predetermined threshold), occurred, is occurring, or is scheduled to occur. The GUI of FIG. 4 is dynamic in nature, and the interface is adaptable to any type of data.

In some aspects, the search query in icon 405 can be searchable (e.g., Boolean) with received data in a first syntax. For example, data may be received having a syntax including "humidity1234", which can be compared (e.g., through use of the analytic algorithm) to metadata identified by the API 346 for each asset in the entire relational model. Based on the comparing, asset results (e.g., cases) that satisfy the condition(s) can be converted, selected, and/or presented in the GUI area 404. The asset results can be presented and/or organized in a selective grid array based on one or more associated status syntax (e.g., a column with one or more identified cases, a column with one more cases in progress, a column with one or more cases completed, etc.). In some aspects, columns of the selective array can be scrollable and more modifiable by the end-user.

Figure 6:
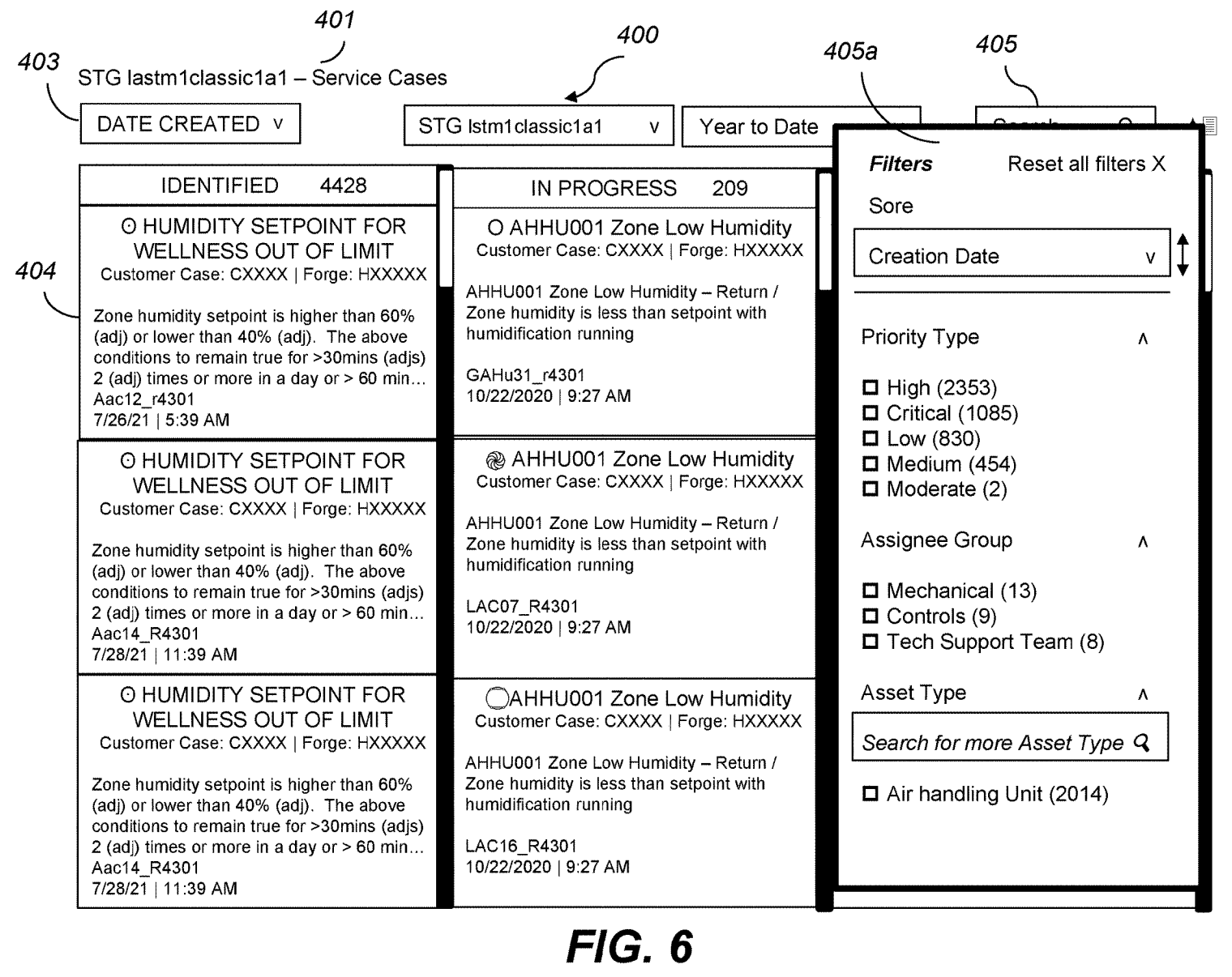

FIG. 5 shows diagram 400 in another mode with exemplary icon 405 being selected by a user. It is understood that each icon of GUI area 404 can include one or graphic labels to facilitate notifying of an event or case of interest. FIG. 6 shows diagram 400 in another mode. For example, in response to selecting icon 405, a search mode icon 405a can be visualized including one or more groups of one or more assets, devices, labels, syntax, and any detected metadata associated with corresponding EOM 350 and/or platform 325. Icon 405a can present one or more asset, device, syntax, and other metadata filters (e.g., priority type, device group type, asset type, creation date, etc.) whereby one or more may be edited at a time via icon 405a. For example, icon 405a may be used to define search query properties for an asset and/or group of assets.

Figure 7:
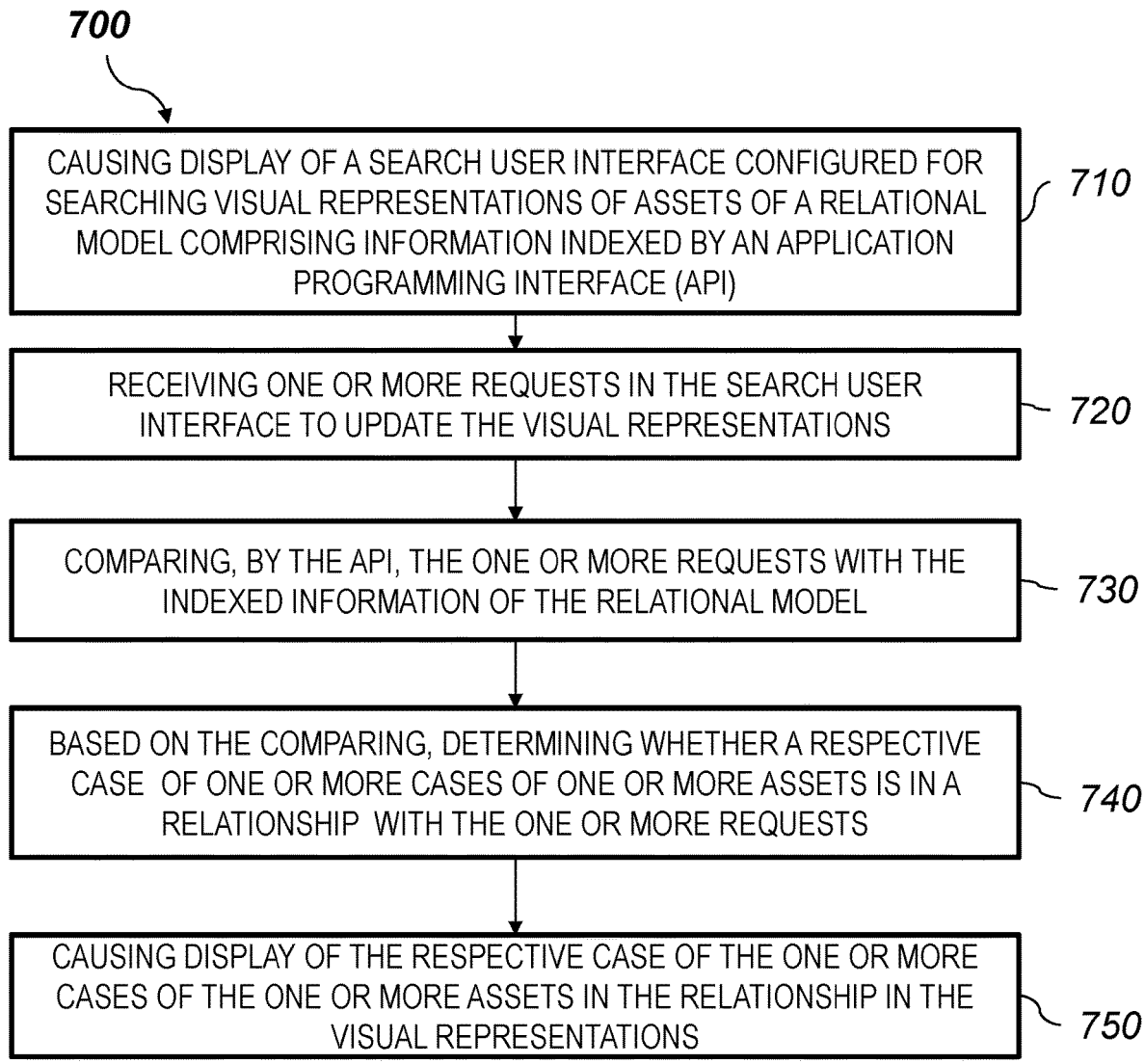
FIG. 7 depicts an exemplary flowchart illustrating a method of switching between modes in a user interface based on user inputs, according to an exemplary embodiment.

FIG. 7 depicts an exemplary method 700 of providing data services via an application programming interface (API) (e.g., API 346) according to an exemplary embodiment. According to one embodiment, the method 700 includes one or more of the following steps. In step 710, the method includes causing display of a search user interface configured for searching visual representations of assets of a relational model comprising information indexed by an application programming interface (API). In step 720, the method includes receiving one or more requests in the search user interface to update the visual representations. For example, the assets can include an AHU, a fan, a damper, etc. The method 700 in step 730 may include comparing, by the API, the one or more requests with the indexed information of the relational model. The method 1500 in step 1540 may include determining, based on the comparing, whether a respective case of one or more cases (such as an instance of something which occurred, is occurring, or will occur e.g., identified case, case in progress, case completed, etc.) of one or more assets is in a relationship with the one or more requests.

The assets referenced in the method 700 may be physical entities and/or non-physical entities. Non-limiting examples of physical entities may be a chiller, an air handling unit (AHU), a fan, dampers, coils, a sensor, a zone control system, a wall module, a return air fan, and a cooling/heating coil, etc. Non-limiting examples of virtual or non-physical entities may be data, such as information technology (IT) data, or a virtual machine or its components and modules.

The relationship of method 700 may be determined by an analytic algorithm that determines whether the one or more requests includes information relevant to one or more cases associated with assets of the relational model. The relationship can include at least one of a "probabilistic relationship" and a "deterministic relationship" that can include factors such as matching words, determined relevance (e.g., same or similar words in request as a label attribute), contextualized case related data (e.g., same or similar time, date, location) from the one or more requests with information of the relational model indexed by the API (e.g., one or more tags in each case such as shared or otherwise overlapping label attributes).

The method 700 of step 750 may include causing display of the respective case of the one or more cases of the one or more assets in the relationship in the visual representations. For example, the one or more cases determined to be in the relationship can be presented so the users can readily view and/or interact with related one or more cases. Additionally, the receiving the request can include searching cases and/or events of edge devices (e.g., devices 161a-161n) in communication therewith. Additionally, the search user interface (e.g., search bar icon 405) may be presented on a graphical user interface and the visual representations (e.g., search mode icon 405a) are presented on the graphical user interface (e.g., GUI area 404).

Additionally, the method 700 can include comparing, by the information of the assets indexed by the API, the one or more requests and a number of occurrences of the respective case being in the relationship. The information can include metadata of the assets. Additionally, the relational model in the method 700 can include or otherwise access the assets with information indexed by the API. In this respect, the method 700 can include updating the relational model to include the relationship, and updating the API based on metadata the assets.

Additionally, the one or more requests received in the search user interface can include at least one of one or more labels, an asset name, one or more labels, one or more descriptions, and one or more services cases. The method 1500 can include generating results of the at least one or more labels, the asset name, the one or more descriptions, and the one or more services cases presented in the visual representations based on determining whether the at least one of the one or more labels, the asset name, the one or more descriptions, and the one or more services cases and the one or more cases is in the relationship with the at least one of the one or more labels, the asset name, and the one or more descriptions.

Additionally, the one or more requests of the method 700 can include data in a first syntax. In this respect, the method 700 can include comparing the first syntax to the one or more syntax of one or more databases of the relational model to determine whether one or more cases is in the relationship. Additionally, in response to user input received in a graphical user interface of the search user interface, the method 700 can include switching the graphical user interface between a first mode (e.g., FIG. 4) and a second mode (e.g., the mode of FIG. 5 and/or FIG. 6 with different or modified GUI area 404, icon 405a, etc.) and displaying one or more cases of in the relationship in the visual representations on the graphical user interface (e.g., cases shown in the grid array of GUI area 404 in FIGS. 4-6).

Additionally, the method 700 can include deriving, by the API indexing information of the relational model, a definition and/or a structure of the assets of the relational model. Additionally, the determining whether the respective case of the one or more cases is in the relationship with the one or more requests is performed by identifying a type of data coming from the indexed information of the relational model The method 700 of FIG. 7 is advantageous since it can utilize one or more metadata driven APIs (e.g., API 346) so that resources from contrasting systems (e.g., a first asset and a second asset) can have related metadata indexed in an automated and/or customizable manner (e.g., each user may provide customized definitions and/or structures for a given asset and related information). In this respect, one or more corresponding search requests from one or more end-users can be executed. For example, the definitions and/or structures can be derived automatically by the relational model (e.g., EOM 350 which can be in communication with the corresponding API, such as API 346 of platform 325). In some aspects, the API of method 700 can be extensible to additional to an additional collection of APIs, assets, and related metadata to enable the model to be extended so as to advantageously learn and implement syntax-based solutions. The API of method 700 is extensible as to its relational model(s) which can include new properties/columns/fields, new classes/tables, and new relations with regards to devices, assets, and APIs that index metadata related to the same. For example, based on the user's requests in the search user interface and/or related icons, the first syntax can be compared to the one or more syntax of one or more databases of the relational model (e.g., databases that include the metadata of assets indexed by API 346) to determine whether one or more cases are related. According to one or more embodiments, data input to the system may be received from many different sources and the data may not initially be ready for use by the system until indexed by API.

Figure 8:
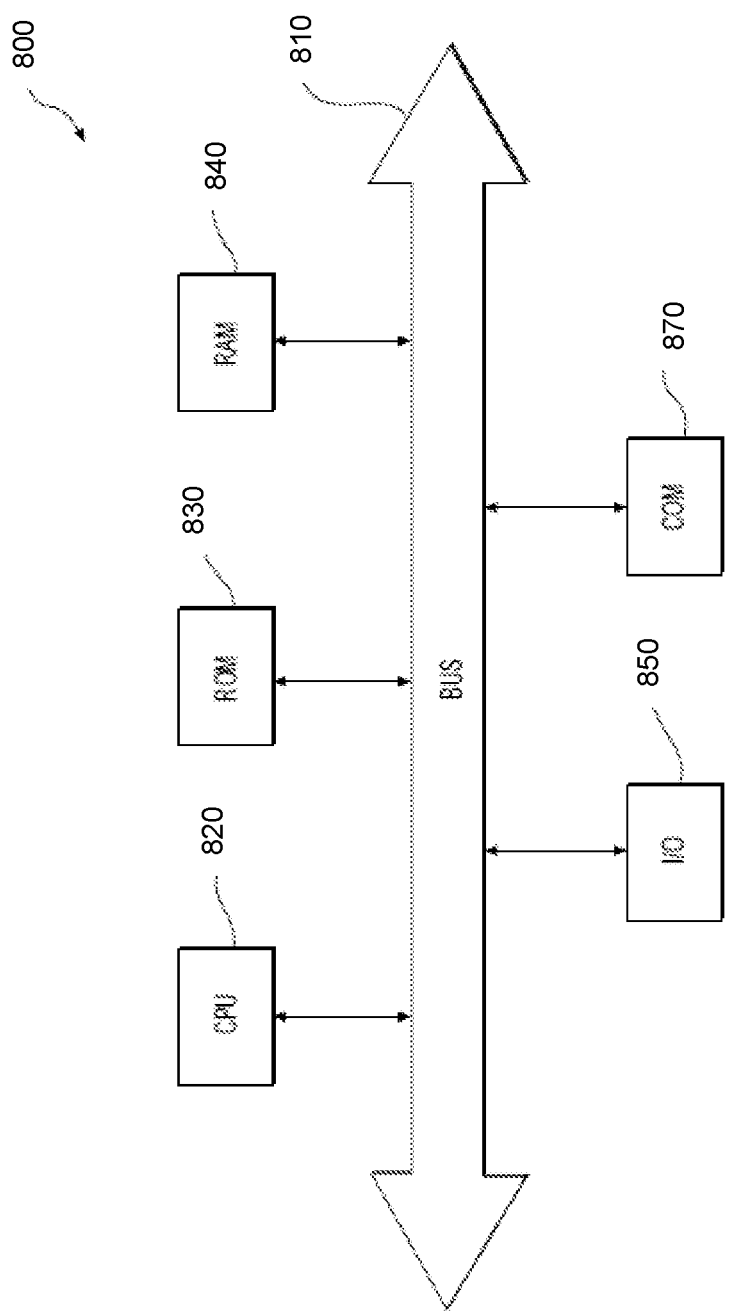
FIG. 8 depicts an example system that may execute techniques presented herein.

FIG. 8 depicts an example system 800 that may execute techniques presented herein. FIG. 8 is a simplified functional block diagram of a computer that may be configured to execute techniques described herein, according to exemplary embodiments of the present disclosure. Specifically, the computer (or "platform" as it may not be a single physical computer infrastructure) may include a data communication interface 860 for packet data communication. The platform also may include a central processing unit ("CPU") 820, in the form of one or more processors, for executing program instructions. The platform may include an internal communication bus 810, and the platform also may include a program storage and/or a data storage for various data files to be processed and/or communicated by the platform such as ROM 830 and RAM 840, although the system 800 may receive programming and data via network communications. The system 800 also may include input and output ports 850 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure also may be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

"'One or more' includes a function being performed by one element, a function being performed by more than one element, e.g., in a distributed fashion, several functions being performed by one element, several functions being performed by several elements, or any combination of the above."

"It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact."

"The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof."

"As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context."

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It is intended that the specification and examples be considered as exemplary only, with a true scope and spirit of the disclosure being indicated by the following claims.

What is claimed is:

1. A method, comprising:
    causing display of a search user interface configured for searching visual representations of assets of a relational model comprising information automatically indexed by an application programming interface (API) of an Internet-of-Things (IoT) platform, wherein the indexed information by the API comprises one or more tags indicative of related metadata of one or more assets for each case;
    receiving one or more requests in the search user interface to update the visual representations;
    comparing, by the API, the one or more requests with the indexed information of the relational model;
    based on the comparing, determining whether a respective case of one or more cases of the one or more assets is in a relationship with the one or more requests, wherein the one or more cases correspond to asset results that satisfy one or more conditions;
    automatically updating the relational model to include the relationship related to the one or more assets based on the determination; and
    causing display of the respective case of the one or more cases of the one or more assets in the relationship in the visual representations, wherein the respective case of the one or more cases is organized in the visual representations based on an associated status of the respective case.

2. The method of claim 1, wherein receiving the request comprises searching cases and/or events of edge devices in communication therewith.

3. The method of claim 1, wherein the search user interface is presented on a graphical user interface and the visual representations are presented on the graphical user interface.

4. The method of claim 1, further comprising: comparing, by the information of the assets indexed by the API, the one or more requests and a number of occurrences of the respective case being in the relationship, the information comprising metadata of the assets.

5. The method of claim 1, wherein the relational model comprises the assets with information indexed by the API, the method further comprising:
    updating the API based on metadata of the assets.

6. The method of claim 1, wherein the one or more requests comprise at least one of one or more labels, an asset name, one or more labels, one or more descriptions, and one or more services cases, the method comprising:
    generating results of the at least one or more labels, the asset name, the one or more descriptions, and the one or more services cases presented in the visual representations based on determining whether the at least one of the one or more labels, the asset name, the one or more descriptions, and the one or more services cases and the one or more cases is in the relationship with the at least one of the one or more labels, the asset name, and the one or more descriptions.

7. The method of claim 1, the one or more requests comprising data in a first syntax, the method comprising comparing the first syntax to the one or more syntax of one or more databases of the relational model to determine whether one or more cases is in the relationship.

8. The method of claim 1, further comprising:
in response to user input received in a graphical user interface of the search user interface;
switching the graphical user interface between a first mode and a second mode; and
displaying one or more cases of in the relationship in the visual representations on the graphical user interface.

9. The method of claim 1, further comprising:
deriving, by the API indexing information of the relational model, a definition and/or a structure of the assets of the relational model.

10. The method of claim 1, wherein the determining whether the respective case of the one or more cases is in the relationship with the one or more requests comprises identifying a type of data coming from the indexed information of the relational model.

11. The method of claim 1, wherein causing display of the respective case of the one or more cases of the one or more assets in the relationship in the visual representations comprises displaying the visual representations on a selective grid array of a graphical user interface comprising a plurality of columns containing one or more associated status.

12. A system, comprising:
a processor; and
a memory,
the processor:
causing display of a search user interface configured for searching visual representations of assets of a relational model comprising information automatically indexed by an application programming interface (API) of an Internet-of-Things (IoT) platform, wherein the indexed information by the API comprises one or more tags indicative of related metadata of one or more assets for each case;
receiving one or more requests in the search user interface to update the visual representations;
comparing, by the API, the one or more requests with the indexed information of the relational model;
based on the comparing, determining whether a respective case of one or more cases of the one or more assets is in a relationship with the one or more requests, wherein the one or more cases correspond to asset results that satisfy one or more conditions;
automatically updating the relational model to include the relationship related to the one or more assets based on the determination; and
causing display of the respective case of the one or more cases of the one or more assets in the relationship in the visual representations, wherein the respective case of the one or more cases is organized in the visual representations based on an associated status of the respective case.

13. The system of claim 12, the processor further:
comparing, by the information of the assets indexed by the API, the one or more requests and a number of occurrences of the respective case being in the relationship, the information comprising metadata of the assets.

14. The system of claim 12, wherein the one or more requests comprise at least one of one or more labels, an asset name, one or more labels, one or more descriptions, and one or more services cases, the processor further:
generating results of the at least one or more labels, the asset name, the one or more descriptions, and the one or more services cases presented in the visual representations based on determining whether the at least one of the one or more labels, the asset name, the one or more descriptions, and the one or more services cases and the one or more cases is in the relationship with the at least one of the one or more labels, the asset name, and the one or more descriptions.

15. The system of claim 12, the one or more requests comprising data in a first syntax, the method comprising comparing the first syntax to the one or more syntax of one or more databases of the relational model to determine whether one or more cases is in the relationship.

16. The system of claim 12, the processor further:
in response to user input received in a graphical user interface of the search user interface switching the graphical user interface between a first mode and a second mode; and displaying one or more cases of in the relationship in the visual representations on the graphical user interface.

17. The system of claim 12, the processor further:
defining an analytic algorithm relating to operation of the API; and
in response to a predetermined condition being met based on the analytic algorithm and the one or more requests, presenting an event of interest related to the predetermined condition in the visual representations.

18. A non-transitory computer-readable storage medium storing instructions that, when executed by a processor, cause the processor to perform a method comprising:
causing display of a search user interface configured for searching visual representations of assets of a relational model comprising information automatically indexed by an application programming interface (API) of an Internet-of-Things (IoT) platform, wherein the indexed information by the API comprises one or more tags indicative of related metadata of one or more assets for each case;
receiving one or more requests in the search user interface to update the visual representations;
comparing, by the API, the one or more requests with the indexed information of the relational model;
based on the comparing, determining whether a respective case of one or more cases of one or more assets is in a relationship with the one or more requests, wherein the one or more cases correspond to asset results that satisfy one or more conditions;
automatically updating the relational model to include the relationship related to the one or more assets based on the determination; and
causing display of the respective case of the one or more cases of the one or more assets in the relationship in the visual representations, wherein the respective case of the one or more cases is organized in the visual representations based on an associated status of the respective case.

19. The non-transitory computer-readable storage medium of claim 18, the processor performing the method further comprising:

defining an analytic algorithm relating to operation of the API; and in response to a predetermined condition being met based on the analytic algorithm and the one or more requests, presenting an event of interest related to the predetermined condition in the visual representations.

20. The non-transitory computer-readable storage medium of claim 18, wherein the one or more requests comprise at least one of one or more labels, an asset name, one or more labels, one or more descriptions, and one or more services cases, the processor performing the method further comprising:

generating results of the one or more labels, the asset name, the one or more descriptions, and the one or more services cases presented in the visual representations based on determining whether the at least one label, the asset name, the one or more labels, the one or more descriptions, and the one or more services cases and the one or more cases is in the relationship with the at least one of the one or more labels, the asset name, and the one or more descriptions.

\* \* \* \* \*